No. 717,126. Patented Dec. 30, 1902.
W. P. SHATTUCK.
ADDING AND LISTING MACHINE.
(Application filed May 20, 1902.)

(No Model.) 9 Sheets—Sheet 1.

WITNESSES.

INVENTOR
William P. Shattuck
BY Paul & Paul
HIS ATTORNEYS.

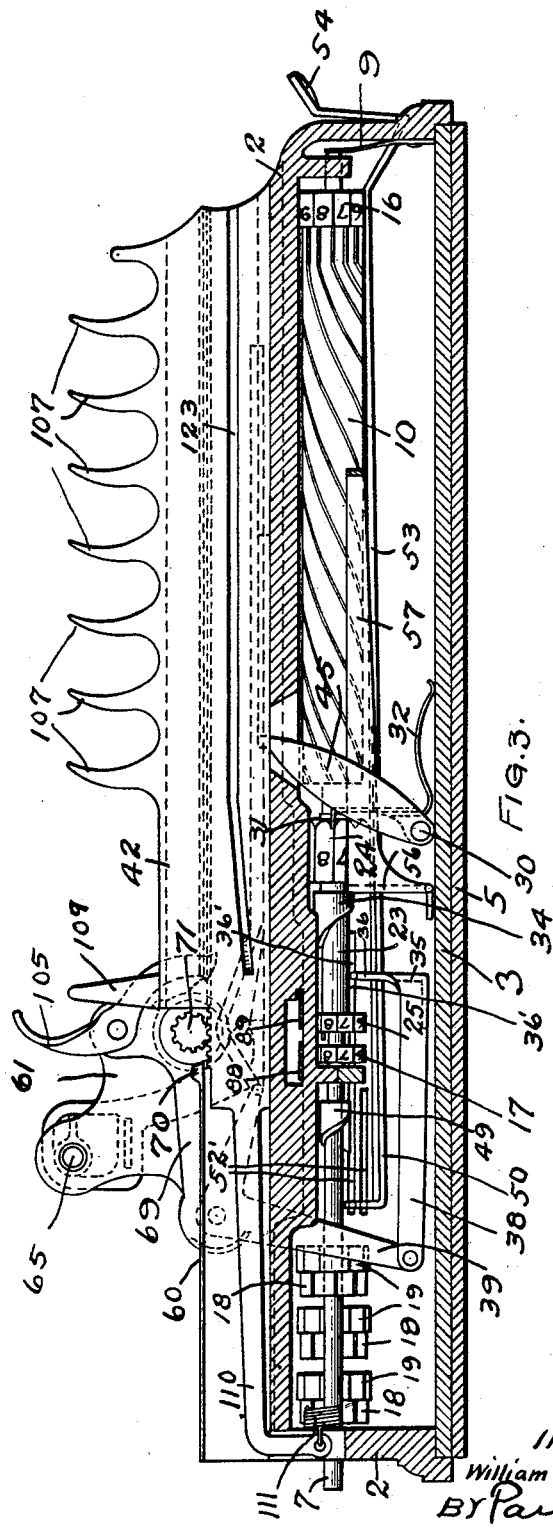

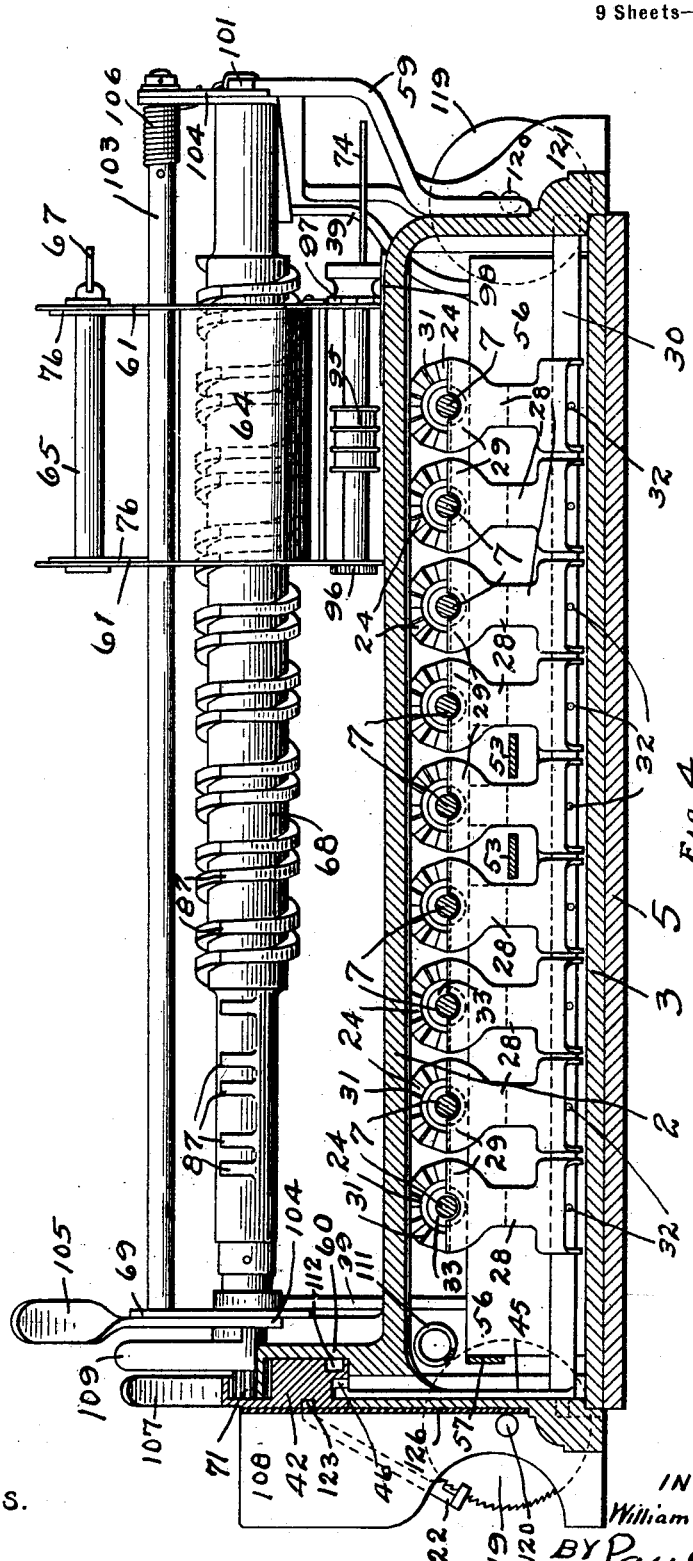

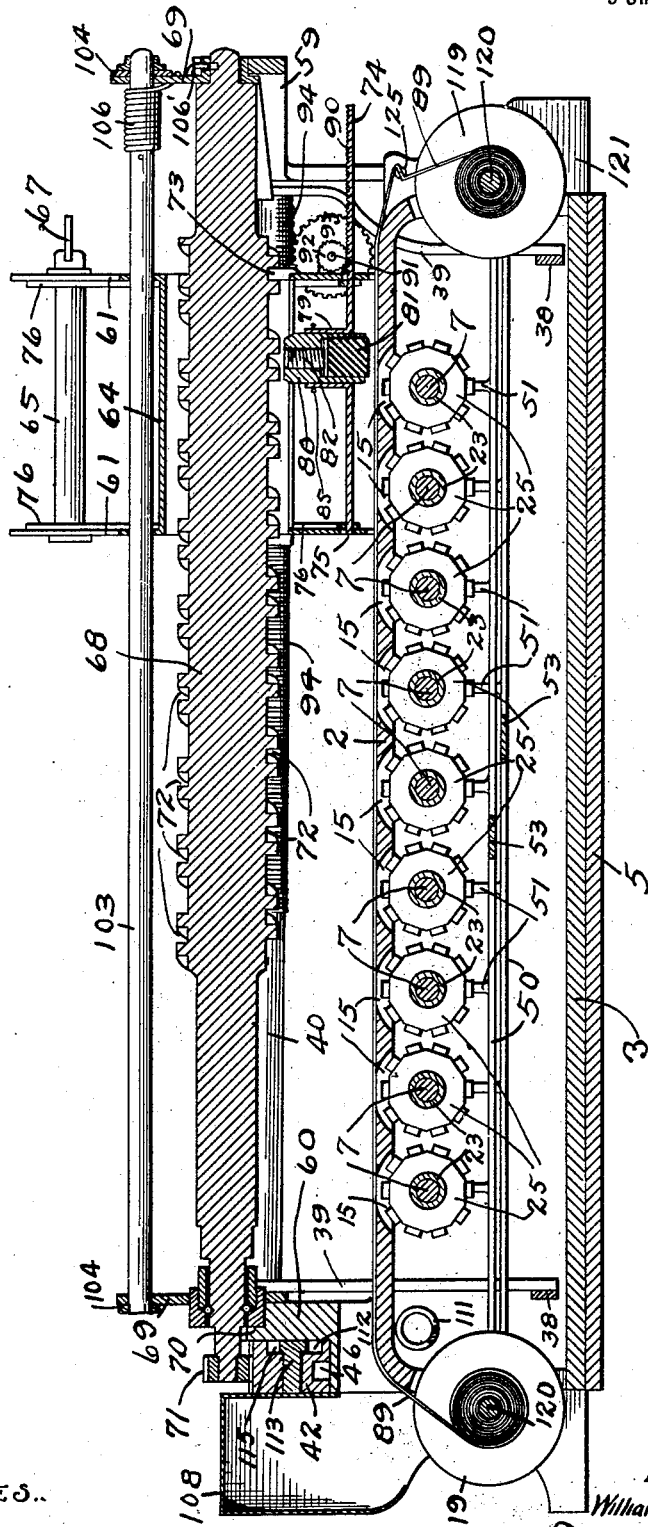

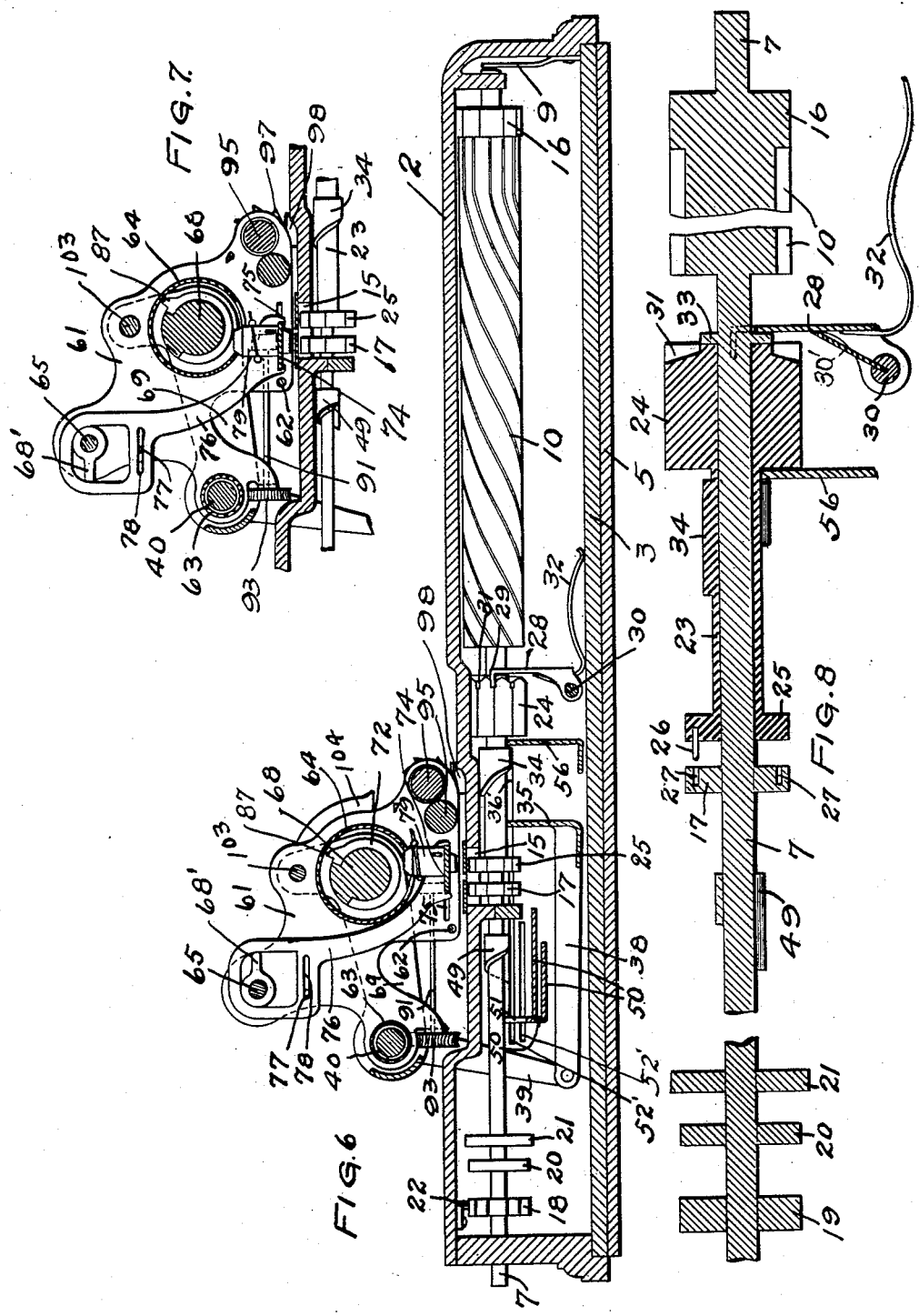

No. 717,126. Patented Dec. 30, 1902.
W. P. SHATTUCK.
ADDING AND LISTING MACHINE.
(Application filed May 20, 1902.)
(No Model.) 9 Sheets—Sheet 7.

WITNESSES
E. G. Staude
O. G. Hanson

INVENTOR
William P. Shattuck
By Paul & Paul
His attorneys

No. 717,126. Patented Dec. 30, 1902.
W. P. SHATTUCK.
ADDING AND LISTING MACHINE.
(Application filed May 20, 1902.)
(No Model.) 9 Sheets—Sheet 8.
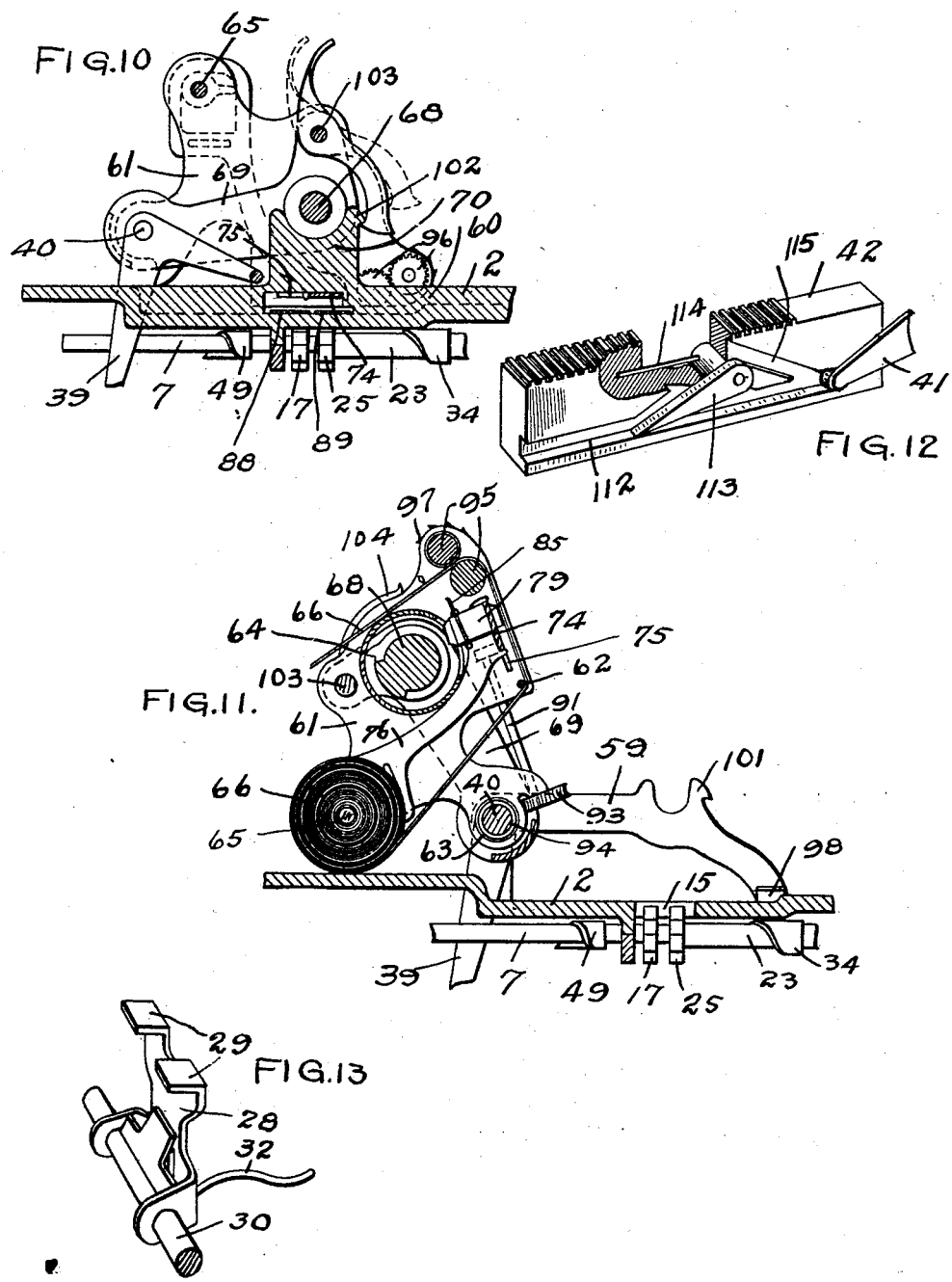
WITNESSES.
INVENTOR
William P. Shattuck
BY Paul & Paul
HIS ATTORNEYS.

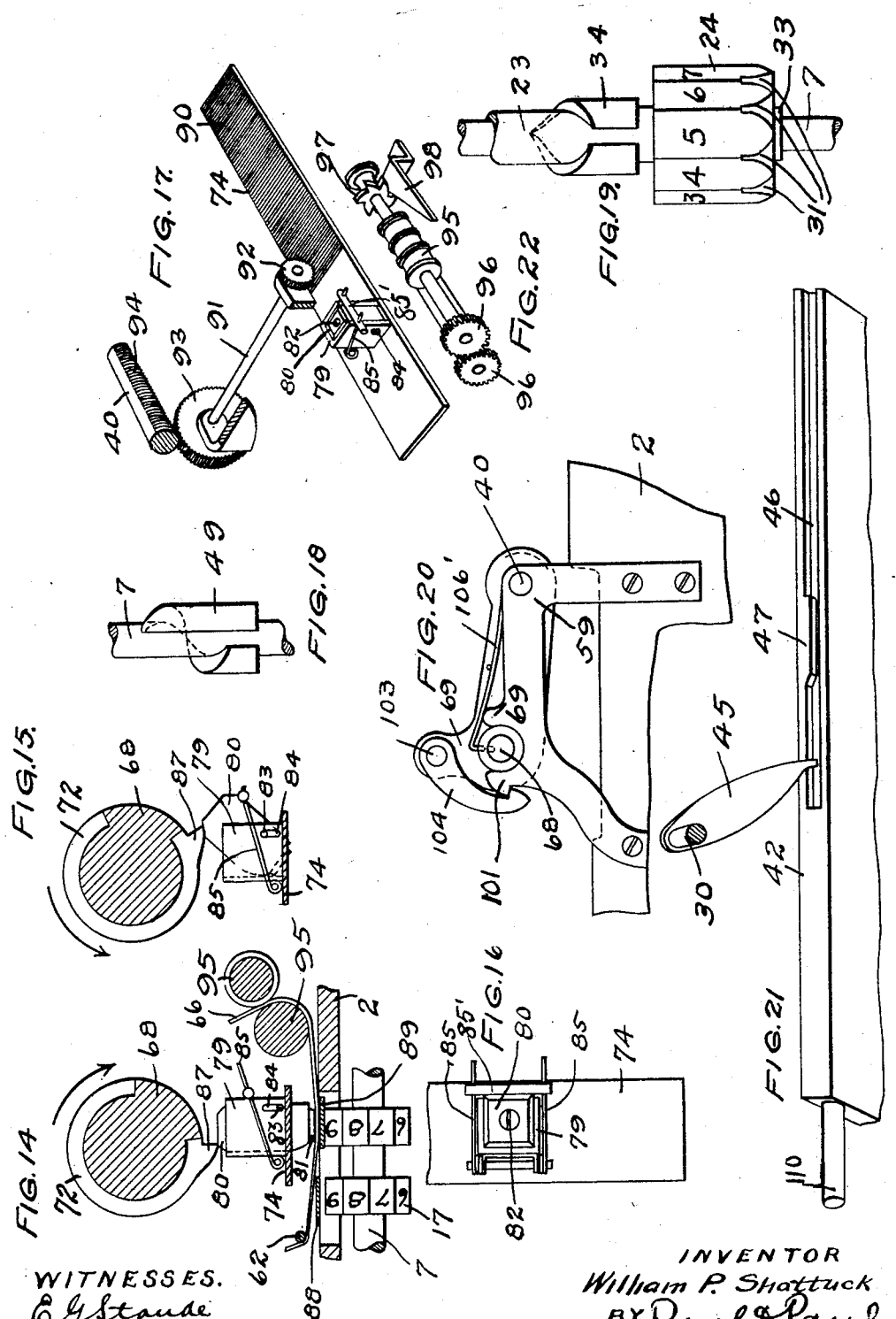

UNITED STATES PATENT OFFICE.

WILLIAM P. SHATTUCK, OF MINNEAPOLIS, MINNESOTA, ASSIGNOR TO THE SHATTUCK MANUFACTURING CO., OF MINNEAPOLIS, MINNESOTA.

ADDING AND LISTING MACHINE.

SPECIFICATION forming part of Letters Patent No. 717,126, dated December 30, 1902.

Application filed May 20, 1902. Serial No. 108,153. (No model.)

*To all whom it may concern:*

Be it known that I, WILLIAM P. SHATTUCK, of Minneapolis, Hennepin county, Minnesota, have invented certain new and useful Improvements in Adding and Listing Machines, of which the following is a specification.

This invention relates to calculators or computing-machines designed especially for adding and listing numbers.

The machine is adapted particularly for listing the amounts of checks or other items, printing upon a suitable record-slip the amount of each item, adding the amount, and printing the total upon the same slip with the items.

The objects of my invention are to provide a machine of this character that shall be simple and inexpensive in construction, easy of manipulation, and absolutely positive and accurate in operation.

The invention consists generally in the constructions and combinations hereinafter described, and particularly pointed out in the claims.

Figure 1:
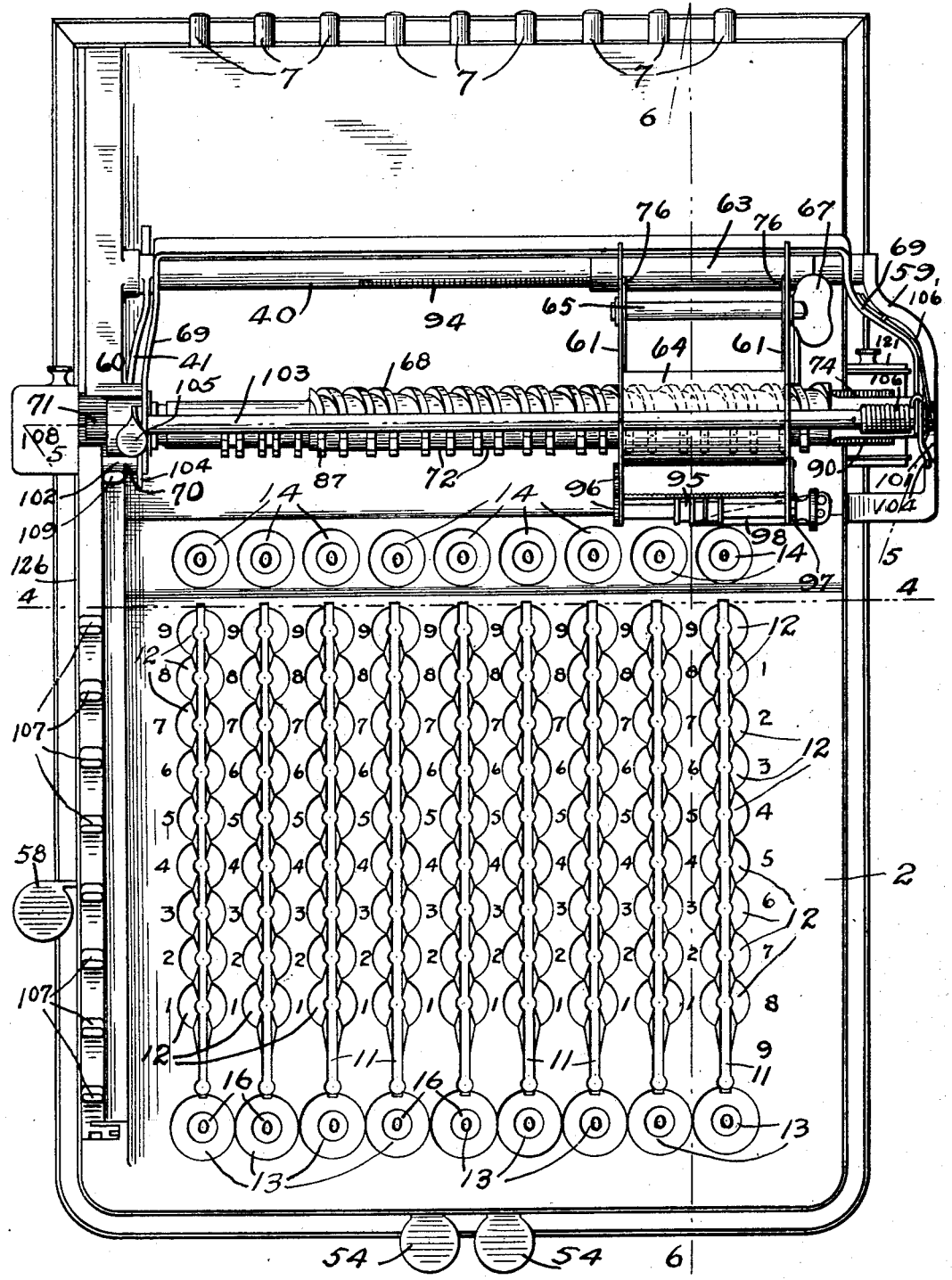
Figure 2:
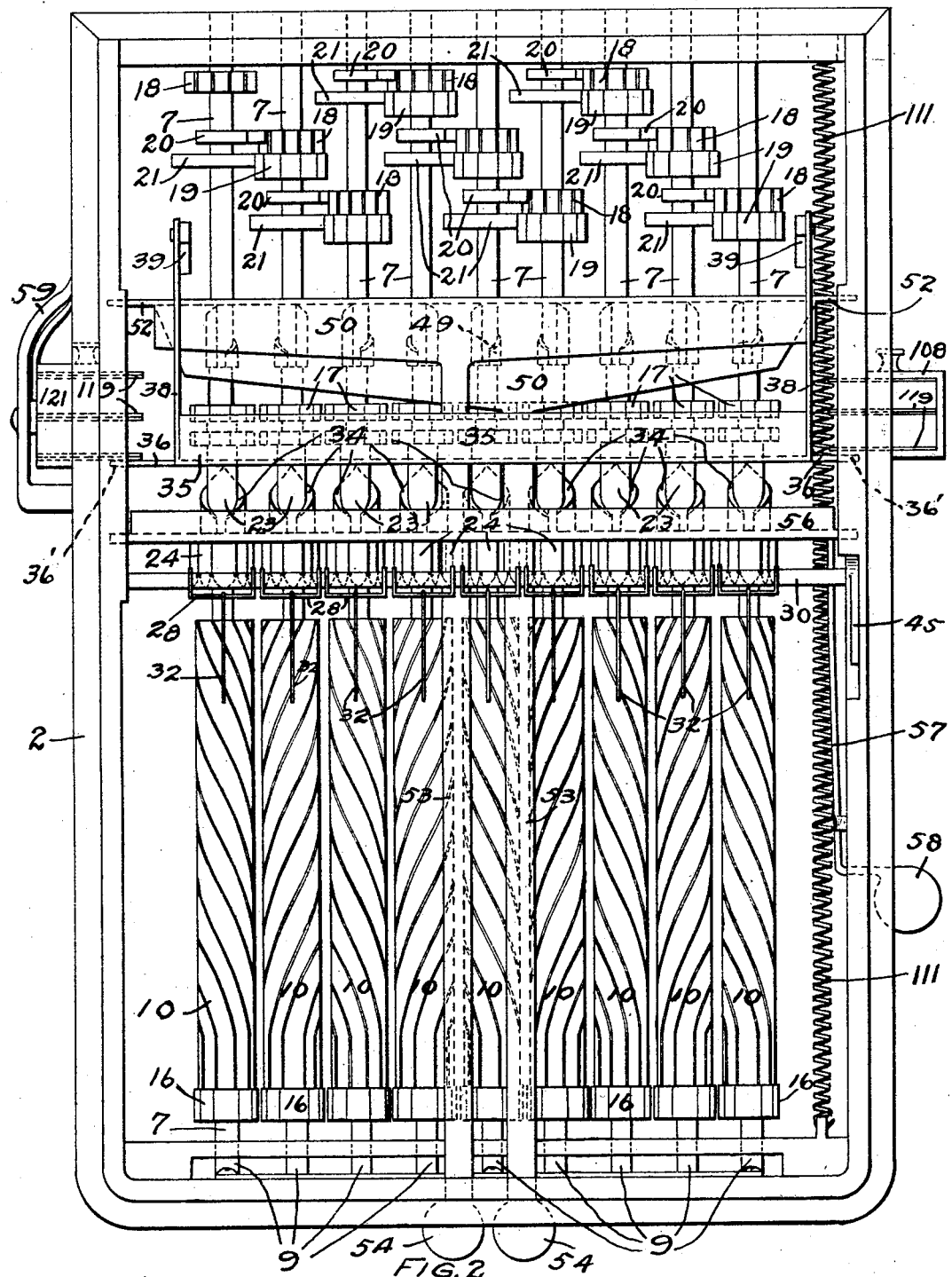
Figure 9:
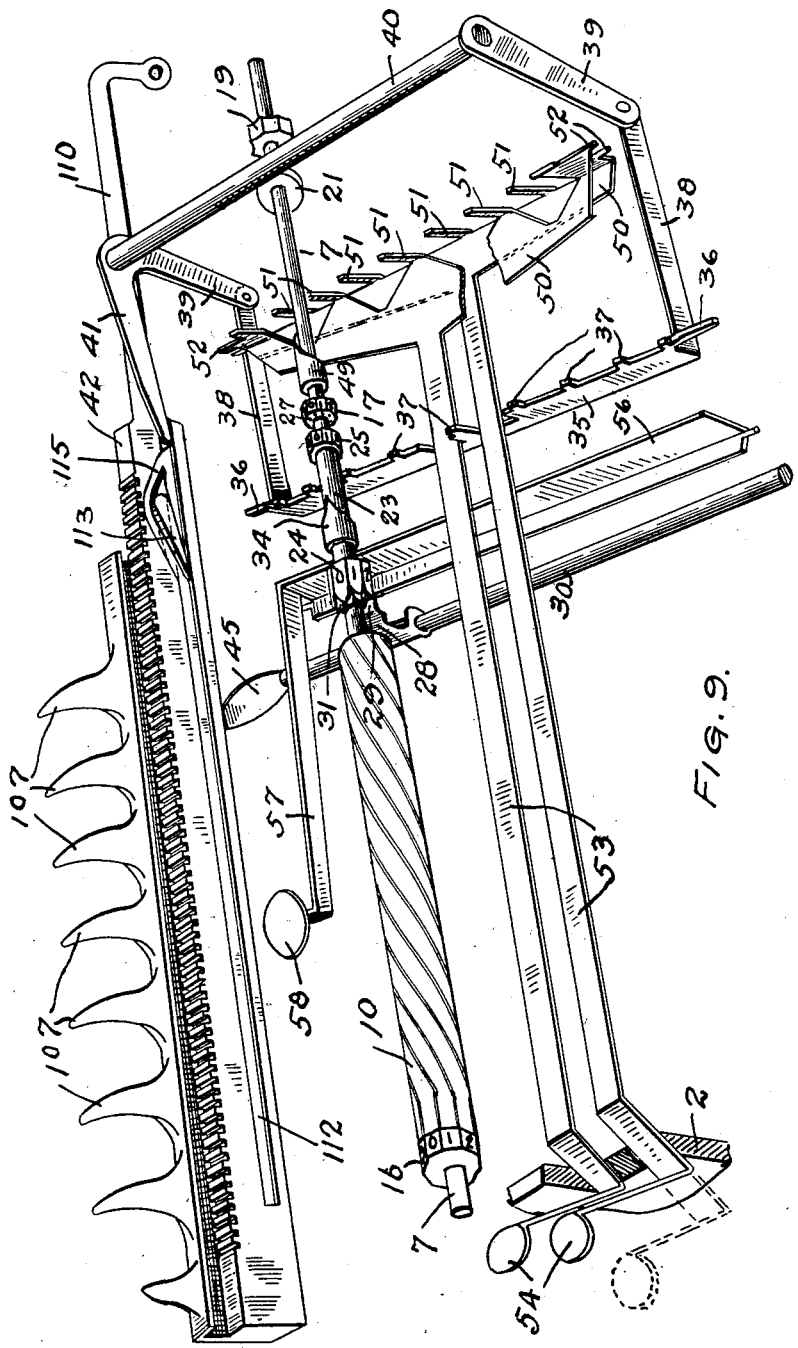

In the accompanying drawings, forming part of this specification, Figure 1 is a plan view of a machine embodying my invention. Fig. 2 is a view looking at the bottom of the machine with the bottom plate of the case removed. Fig. 3 is a side elevation with the side wall of the case removed. Fig. 4 is a transverse vertical section on line 4 4 of Fig. 1. Fig. 5 is a transverse vertical section on line 5 5 of Fig. 1. Fig. 6 is a longitudinal vertical section on line 6 6 of Fig. 1. Fig. 7 is a section view of the printing-carriage similar to that shown in Fig. 6, but with the platen moved into position to print a total. Fig. 8 is a longitudinal section, on an enlarged scale, of one of the main shafts provided with the operating-spirals. Fig. 9 is a perspective view of one of the main shafts and the mechanism for resetting either of the printing-wheels at zero. Fig. 10 is a detail of the printing mechanism and its support, showing the means for locking the carriage in printing position. Fig. 11 is a detail of the printing mechanism, showing the carriage raised to expose the lower part of the paper. Fig. 12 is a perspective detail of a portion of the resetting mechanism. Fig. 13 is a perspective detail of the spool-lock. Fig. 14 is a detail showing the operation of pressing the paper against the ribbon and type wheels by means of the platen or plunger and cam-shaft. Fig. 15 is a detail showing the platen or plunger tilted forward by the reverse movement of the cam-shaft. Fig. 16 is a plan view of the platen-holder, showing the position of the platen or plunger in relation thereto. Fig. 17 is a perspective view showing the platen and the means for advancing it during the printing operation. Fig. 18 is a detail showing the spiral cam on the main shaft by means of which the shaft is reset at zero. Fig. 19 is a detail showing the sleeve on the main shaft carrying the item-indicating wheel and item-printing wheel and showing the cam thereon for resetting these wheels at zero. Fig. 20 is a side elevation showing the means for locking the cam-shaft when the carriage is in position for beginning the printing operation. Fig. 21 is a detail perspective of a portion of the rack-bar 42, showing the means for releasing or unlocking the sleeves carrying the item-wheels when said wheels are to be reset at zero. Fig. 22 is a perspective view of the paper-feeding device.

In the drawings, 2 represents the casing of the machine, which may be of any suitable form and construction. I prefer to make this case in the form of a casting, having an open bottom that may be closed by a removable bottom plate 3, and for the purpose of holding the machine in a stationary position and preventing it from slipping when placed upon a desk or table I prefer to provide a rubber sheet or plate 5, that is secured to the under side of the plate 3. I may, however, use rubber strips or buttons in place of the rubber sheet. All of the interior mechanism of the machine is preferably secured to the casing 2, so that the bottom plate 3 may be removed, thereby exposing all of the interior mechanism without disconnecting any part of it. Upon removing the bottom plate the machine will appear as shown in Fig. 2 of the drawings. Mounted in bearings in the casing 2 are a series of main shafts 7, which preferably extend substantially the full length of the casing and project through the rear wall of the casing, as shown in Figs. 1 and 3 of the drawings. These shafts are capable of a slight longitudinal movement in their bearings, but are normally held at the limit of their rearward movement by means of the springs 9, preferably arranged upon the wall of the casing and bearing upon the ends of the shafts, as shown in Fig. 3. Each shaft is provided with a spiral portion 10, having ten spiral grooves, each making a complete turn about the shaft and preferably terminating in straight grooves at the forward end of the shaft. The casing 2 is provided with a series of longitudinal slots 11, one of said slots being arranged directly over each of the shafts 7, so that by inserting an operating-tool through the slot 11 the end of said tool may be brought into any one of the spiral grooves in the shaft 7. I prefer to provide a series of conical recesses 12 in the top of the case, the center of each recess being coincident with the central line of the slot 11. Nine of these recesses are provided, equally spaced, and these recesses form guides for the insertion of the operating-tool into the slot and hence into the spiral grooves in the main shaft 7. Any number of the shafts 7 and a corresponding number of the slots 11 may be provided. I have shown the machine provided with nine shafts 7 and nine slots 11, and the machine, as shown, is capable of adding and listing numbers up to a total of nine hundred and ninety-nine million nine hundred and ninety-nine thousand nine hundred and ninety-nine. The casing 2 is also provided with a series of openings 13, arranged, preferably, at the forward ends of the slots 11, and with a corresponding series of openings 14 at the rear ends of said slots. It is also provided with a series of slots or openings 15, one of said openings being arranged in line with each of the slots 11 and openings 13 and 14. Each shaft 7 has a figured indicating-wheel 16 at its forward end beneath the recess or opening 13, and through this opening one of the figures upon said wheel may always be seen. The shaft 7 has also secured to it a type-wheel 17, the type upon said wheel corresponding to the figures upon the wheel 16 and said wheels being in the same relative position upon the shaft, so that the figure that is shown through the slot or opening 13 will be the one that is in printing position upon the wheel 17. A series of numbers running from "1" to "9" is arranged upon the top or front of the case at the left of each of the slots 11 and opposite each of the depressions 12. These numbers indicate the number of tenths of a revolution that the spiral shaft will be turned by insertion of the stylus or operating-tool into any one of the depressions and through the slot into one of the spiral grooves below and drawing the stylus or tool forward until it reaches the end of the slot 11. I also prefer to provide at the right of the first slot 11 a series of numbers running in the reverse direction, the figure "1" being opposite the "8" in the other rows. These numbers are to be used when it is desired to use the machine for subtraction. For instance, if it is desired to subtract "1" from the number shown by the figures exposed through the openings 13 it is necessary to insert the stylus into the recess 12 opposite the figure "1" in the right-hand row and then to push the stylus toward the rear end of the slot 11. In order to do this, however, the shaft must be unlocked by pressing inward on the end of the shaft 7 where it projects through the end of the casing. The series of shafts 7 are connected by transmitting gears in such manner that each shaft is free to be rotated independently of all of the shafts to the right thereof, (to the left in the bottom plan view, Fig. 2,) while when each shaft makes a complete revolution the next succeeding shaft at the left (to the right in Fig. 2) is compelled to move one step or make one-tenth of a revolution. This result is secured by using for connecting the shafts what is known as the "Geneva" stop-movement in connection with the provision already described for permitting each shaft a slight longitudinal movement in its bearings against the tension of the spring 9. Each shaft is provided with a ten-tooth gear 18, with a disk 19, having concave recesses in its edge, with a disk 20, having a single tooth arranged to engage the gear 18 upon the next succeeding shaft, and with a disk 21, having its edge projecting into the recesses in the edge of the disk 19 upon the next succeeding shaft. The first shaft in the series is provided with the gear 18, which serves simply as a locking-disk, and is engaged by a pin or stud 22 in the casing of the machine. (See Fig. 6.) The last shaft, or the one at the left, (at the right in Fig. 2,) does not have the disks 20 and 21. The gears 18 and locking-disks 19 are substantially twice the width of the disks 20 and 21, so that by giving each shaft a slight longitudinal movement against the tension of the spring 9 the gear 18 and locking-disk 19 thereon are disconnected from the disks 20 and 21 on the preceding shaft, while the disks 20 and 21 on the shaft that is thus moved still remain in engagement with the gear 18 and locking-disk 19 of the next succeeding shaft. The longitudinal movement of the shaft is obtained by the engagement of the operating-tool therewith—that is to say, by the insertion of the point of the locking-tool into one of the spiral grooves of the shaft 7 and the drawing of the point of the tool forward or toward the operator the shaft will be moved bodily forward in its bearings against the tension of the corresponding spring 9 and the gear 18 and locking-disk 19 will be disengaged from the disks 20 and 21 of the shaft to the right or the preceding shaft of the series. This construction enables each shaft to be operated independently of all of the preceding shafts of the series, while causing the succeeding shafts to be operated therefrom. I may use any kind of intermittent gears between the shafts 7; but I prefer the Geneva stop-gears, as they absolutely prevent independent movement of any shaft or the overthrowing or overrunning thereof.

In an application filed September 24, 1900, Serial No. 3,947, renewed July 23, 1902, Serial No. 116,610, I have shown and described a calculator or adding-machine having the series of spiral shafts and transmitting-gears herein described. In the machine shown and described in that application, however, the printing or listing mechanism was not present. In the machine of my present application I employ the mechanism of my said former application with additional devices for indicating each item, for printing or listing separate items, and for printing or listing the total.

Arranged upon each shaft 7 is a sleeve 23, carrying a figured indicating-wheel 24 and a figured type or printing wheel 25, the figures upon one wheel corresponding to those upon the other. The purpose of these wheels is to indicate and print or list the amount of each separate item. It is therefore necessary that at each operation the wheels 24 and 25 shall turn with the shaft 7 and that as soon as the item has been listed or printed these wheels shall be reset at zero, while the wheels 16 and 17 remain in position to show or list at any time the total or the sum of all of the operations. I therefore provide means by which all of the sleeves 23 and the wheels 24 and 25 are arranged or held in a stationary position until the corresponding shaft 7 is operated, and which will then cause the sleeve 23 to be connected to the shaft 7 and to rotate therewith, and which as soon as the item has been listed or printed will cause the wheels 24 and 25 to be reset at zero independently of the shafts 7 and the wheels 16 and 17. In carrying out this object of my invention I provide upon the face of the wheel 25 that is toward the wheel 17 a pin 26, and I provide the wheel 17 with a series of recesses 27. By this means as soon as the shaft 7 is moved forward or longitudinally against the tension of the spring 9 the pin 26 is engaged by one of the recesses 27, thereby locking the sleeve 23 to the shaft 7 and causing the wheels 24 and 25 to turn in unison with the wheels 16 and 17. By this means whenever any one of the shafts 7 is turned the sleeve 23, mounted thereon and carrying the wheels 24 and 25, will move in unison with said shaft 7. Ordinarily each sleeve 23 is locked and prevented from rotary movement by a locking-plate 28, having teeth 29 and mounted loosely upon the transverse shaft 30. The forward face of each wheel 24 is provided with a series of slots or recesses 31, preferably of substantially V shape, and these recesses are adapted to be engaged by the tooth 29 and the locking-plate 28. (See Fig. 8.) A spring 32 is connected to the locking-plate 28 and bears upon the bottom of the casing and tends to throw the plate 28 rearward and cause the tooth 29 to engage said recesses 31. A collar 33 is formed upon or secured to the shaft 7 between the wheel 24 and the locking-plate 28, so that the forward movement of the shaft 7 causes the collar 33 to press against the plate 28 and to move said plate against the tension of the spring 32 and to release the wheel 24. Therefore as each shaft 7 is drawn forward by the pressure of the operating-tool the corresponding sleeve 23, with the wheels 24 and 25, will be unlocked and through the pin 26 will be connected to the wheel 17 and shaft 7 and caused to turn therewith. As soon, however, as the operating-tool is removed from the slot 11 and from engagement with the spiral groove on the shaft 7 the spring 32 will cause the locking-plate to be pressed backward and will cause the tooth 29 to engage the recesses 31, thereby locking the sleeve 23 and the wheels 24 and 25. It is essential, however, that the wheels 24 and 25 shall be turned back to zero immediately after each printing or listing operation, while the wheels 16 and 17 remain in the position to which they have been turned until the total amount is listed. For the purpose of resetting the wheels 24 and 25 at zero after each operation I provide a resetting device arranged to be operated after each listing or printing operation and while the carriage carrying the listing or printing mechanism is being moved back to its original position. For this purpose I provide upon each of the sleeves 23 a cam 34, and I also provide a sliding plate 35, having reduced ends 36, (see Fig. 6,) arranged to travel in guide-slots 36' in the wall of the casing. This plate is provided with a series of upwardly-projecting lugs 37 and it is connected by arms 38 to suitable crank-arms 39, secured upon a transverse shaft 40, mounted in stationary bearings above the casing 2. The shaft 40 is also provided with the crank-arm 41, arranged to be operated upon the reverse movement of the rack-bar, (see Fig. 9,) as hereinafter described. The lugs 37 upon the plate 35 engage the cams 34 upon the sleeves 23 and reset or turn back to zero said sleeves and the wheels 24 and 25 carried thereby. In order, however, that this operation may take place, the locking-plates 28 must be moved so as to disengage the teeth 29 from the slots 31, and this is accomplished by mounting the plates 28 loosely upon a transverse shaft 30 and providing said shaft with fixed arms 30', engaging said plates, and a crank-arm 45, having its end projecting into a slot 46 in the under side of the rack-bar 42. A projection 47 in this slot engages the end of the crank-arm 45 and rocks the shaft 30, causing the locking-plates 28 and teeth 29 to be disengaged from the wheels 24 momentarily, thereby permitting said wheels and the wheels 25 to be turned back to zero by the engagement of the lugs 37 upon the plate 35 with the cams 34 upon the sleeves 23.

It will be noted from an examination of Fig. 2 of the drawings that the alternate shafts are arranged with their spirals extending in opposite directions. This is necessary in order that each shaft may be rotated, when necessary, from the preceding shaft, and as I provide means for resetting the shafts 7 or causing them to be turned into position to bring the wheels 16 and 17 to zero it is necessary to provide separate means for resetting those shafts which have their spirals extending in one direction and those which have their spirals extending in the other direction. For this purpose I provide each of the shafts 7 with a spiral cam 49, and also provide sliding plates 50, carrying upwardly-extending lugs or projections 51, adapted to engage the cams 49 and turn said shafts 7, so as to bring the indicating and printing wheels to zero. The plates 50 are provided with the guide-lugs 52, (see Fig. 6,) that engage slots 52' in the casing of the machine, and also with the arms 53, extending through the forward end of the casing and provided with the finger-pieces 54. By drawing forward the plates 50 separately the shafts 7 will all be turned, so as to bring the indicating and printing wheels to zero. When one plate is operated, half of the shafts will be disengaged from the other shafts by being moved longitudinally, and then the engagement of the lugs 51 with the cams 49 will rotate said shafts and bring them all to the desired position.

It is desirable to move the sleeves 23, the wheels 24, and the wheels 25 into such position when the wheels 16 and 27 are to be reset at zero that the pins 26 will not be engaged by the recesses in the wheels 17, as otherwise in turning the wheels 16 back to zero the wheels 24 will also be rotated and will be moved from zero position to some other position. For this purpose I provide the plate 56, extending transversely beneath the shaft 7 and pivotally supported in the wall of the casing. This plate is provided with an upwardly-projecting portion that extends into a recess upon each sleeve formed between the wheel 24 and the cam 34. An arm 57 extends from the plate 56 through the side wall of the casing and is provided with a button or head 58. When it is desired to reset the wheels 16 at zero, the button 58 is pressed downward, thereby sliding the sleeve 23 and the wheels 24 and 25 forward or away from the wheels 17. The button 58 is held pressed downward, and the resetting devices are then operated, and thereby the spiral shafts and the wheels 16 and 17 are rotated, so as to bring the zero-mark upon each wheel 16 into an exposed position, and consequently to bring the zero-type upon each wheel 17 into printing position.

If preferred, the type-wheels 17 and 25 and all of the listing mechanism may be omitted, in which case the machine will be simply a calculating-machine without any listing attachment. In this instance the parts of the mechanism already described will constitute the entire machine, and the printing mechanism about to be described will be wholly omitted. I contemplate building a machine in this way, as well as in the form of a simple adding-machine, such as shown and described in my former application for patent, hereinbefore referred to.

The printing mechanism consists, essentially, of a carriage arranged to carry a roll of paper, the paper being preferably in the form of a long slip, with means for moving the carriage forward and back across the top of the casing and over the type or printing wheels and with means for pressing the paper against the type as it passes over each wheel, whereby the paper will be pressed against the uppermost type on the wheel. Provision is made for moving the carriage only so far as is necessary to print the numbers that have been set up by the operator. The carriage may be operated first so as to print from the wheels 25 or those representing the item, and afterward when it is desired to print the total the carriage may be set so as to print from the wheels 17. This operation will print the total of the number of items previously printed from the wheels 26. The shaft 40, hereinbefore referred to, is mounted in stationary bearings upon the casing of the machine, the bearing at one side of the machine being provided in a standard 59, secured upon the casing 2, and the bearing at the other side of the machine being provided in an upright flange 60, arranged at one edge of the casing 2. The carriage consists of a frame provided with suitable side plates 61, connected by bolts or rods 62. This carriage is pivotally mounted upon the shaft 40, being provided with a sleeve 63, which surrounds said shaft. The carriage is also provided with a sleeve 64, through which the cam-shaft, hereinafter described, passes. A removable shaft 65 is mounted in bearings in the side plates 61, and this shaft is adapted to carry the roll of paper 66, (see Fig. 11,) upon which the amounts are to be printed. The shaft 65 is provided with a thumb-piece 67, by means of which it can be rotated in its bearings. This shaft is also provided with a lug or cam 68' near each end and just inside of the side plates 61. These cams are for the purpose of shifting the platen-holder, as hereinafter described. The cam-shaft 68, which passes through the tube or sleeve 64 in the carriage, is mounted at its ends in arms 69, pivotally supported upon the shaft 40. A boss or hub is provided in each of the arms 69 to form the bearing for the cam-shaft 68, and at one end this bearing is preferably provided with anti-friction-rollers. (See Fig. 5.) The hubs on the arms 69 when the cam-shaft is in its normal position rest upon stationary supports on the casing of the machine, the support at the right being preferably formed upon the bracket 59 and the support at the left being in the form of a projection 70 from the main part of the casing and provided with a recess that receives the hub on the arm 69. The cam-shaft 68 is provided at its end with a pinion 71, that engages the teeth of the rack-bar 42. By reciprocating this rack-bar the cam-shaft is rotated, as hereinafter described. The shaft 68 serves the double purpose of moving the carriage across the machine and at the same time forcing downward the platen and pressing the paper against the type-wheels. For the purpose of moving the carriage forward and back across the machine a spiral groove 72 is provided in the shaft 68. This groove is not in the form of a true spiral, but there is in each turn in the groove a straight portion which permits the carriage to remain stationary during the time while the paper is being pressed against the type-wheels. A lug 73 (see Fig. 5) is provided on the carriage to engage the groove 72, and thereby the carriage is caused to move across the machine as the cam-shaft is rotated. A movable plate 74 is arranged in slots 75 in the lower ends of the side plates 61 of the carriage. The length of the slot is greater than the width of the plate, so that said plate may be shifted in said slots, and suitable arms 76 engage said plate and extend upward inside of the side plate 61 and are provided with openings that receive the cams 68' on the shaft 65. Suitable guide-pins 77 upon the side plates engage slots 78 in the arms 76. (See Fig. 6.) The plate 74 forms a guide and support for the platen or plunger by which the paper is pressed against the type-wheels. As herein shown, there is a rectangular projection 79 on the top of the plate 74. This projection has one open side (see Figs. 14, 15, 16, and 17,) and arranged within it is a platen block or plunger 80, preferably provided with a recess or socket in its lower end and having therein the adjustable block 81. Said platen is also provided with an adjusting-screw 82, by means of which the position of the block may be regulated. This plunger is connected to the projection 79 by means of a pin 83, engaging a slot 84 in said projection. The plunger is firmly held in upright position by means of a spring 85, that is connected to the projection 79 and whose free ends pass through holes in a crossbar 85', secured to the plunger 80. This spring is put under tension when the plunger 80 is tilted forward, as shown in Fig. 15 of the drawings. The cam-shaft 68 is provided with a series of cam projections 87, and these projections as the shaft is rotated in one direction (being the direction indicated by the arrow in Fig. 14) will successively engage the top of the platen or plunger 80 and will force said plunger downward, pressing the paper onto the type-wheels. When the movement of the shaft is reversed for the purpose of returning the carriage to its original position, the square shoulder on the cam 87 strikes the side of the plunger near the top and tilts said plunger (see Fig. 15) sufficiently to permit said cam to pass it without depressing the plunger. As soon as the projection on the cam-shaft passes the plunger 80 the tension of the spring 85 causes the plunger to be turned back to its normal or vertical position. (Shown in Figs. 14 and 17.) Two printing-ribbons 88 and 89 are arranged to extend transversely over the type-wheels, one of said ribbons being arranged over one row of type-wheels and the other being arranged over the other row of type-wheels. As the carriage is advanced by the rotation of the cam-shaft in the direction indicated by the arrow in Fig. 14 the cam projections 87 on said shaft engage the top of the plunger or platen 80, forcing said plunger downward, and thereby pressing the paper against the type-wheels and the interposed ribbon. By means of the shaft 65, with its cam projections 68', the plate 74 and platen may be adjusted so as to bring said platen over either row of type-wheels. In Fig. 1 the platen is shown over one ribbon and row of type-wheels and in Fig. 7 it is shown over the other ribbon and row of type-wheels. It is also necessary as the carriage is advanced to change the position of the platen relatively to the paper in order that the printed figures may appear in proper position thereon. I accomplish this by providing a series of teeth 90 upon the upper surface of the plate 74 or making said plate in the form of a rack-bar and providing in bearings on one of the side plates of the carriage a shaft 91, having a pinion 92 engaging the teeth 90 on the plate 74 and a pinion 93 engaging a series of teeth 94 on the shaft 40. By this means as the carriage is advanced the position of the plate 74 relatively to the carriage is changed and the platen is always brought into proper position for printing. As the teeth upon the top of the plate 74 extend the full width of the plate, said teeth will remain in mesh with the pinion 92 in whichever position the plate 74 may be and the teeth 94 are extended sufficiently far around the shaft 40 to permit said teeth to remain in mesh with the teeth in the pinion 93 when the carriage is elevated and occupies the position shown in Fig. 11 of the drawings. For the purpose of feeding the paper I provide the feed-rolls 95, mounted in bearings in the side plates of the carriage and connected together by means of the pinions 96. Any suitable means may be employed for rotating these rolls after each printing operation. I have here shown one of said rolls provided with a ratchet-wheel 97, adapted to engage an inclined lug 98 upon the casing of the machine as the carriage returns to its normal position. By this means the rolls are rotated sufficiently to advance the paper so as to properly space the lines of figures upon the paper strip. For the purpose of locking the cam-shaft and carriage in printing position or permitting the same to be elevated to the position shown in Fig. 11 of the drawings I provide upon the bracket 59 a lug 101 (see Fig. 11) and upon the bearing 70 a lug 102. I also provide a shaft 103, that is mounted in the arms 69 and is provided with hooks 104, adapted to engage the lugs 101 and 102. This shaft is also preferably provided with a thumb-piece 105, by means of which said shaft may be turned to release the hooks from said lugs. A spring 106 is provided upon the shaft 103, and this spring tends to hold said hooks in engagement with the lugs at all times. When in its normal position, the cam-shaft is supported by the bracket 59 and projections 70 and the pinion 71 on said shaft is in engagement with the teeth of the rack-bar 42. By releasing the hooks 104 the carriage and shaft may be turned up, the arm 69 swinging upon the shaft 40, so as to cause the carriage and cam-shaft to occupy the position shown in Fig. 11 of the drawings, in which position the paper beneath the platen is exposed to view. For the purpose of locking the cam-shaft when the carriage has been returned to its original or normal position I prefer to provide a spring-dog 106, adapted to project through the boss or bearing for the shaft and to engage a recess in said shaft. (See Fig. 20.) For the purpose of moving the rack-bar 42 I prefer to provide a series of projections 107 thereon. There are preferably one less of these projections than there are spiral shafts in the machine. A lug 109 is provided on the casing of the machine close to and at one side of the rack-bar 42. In operating the rack-bar the operator will place his thumb upon one of the projections 107 and grasping with his fingers a projection 108 upon the side of the casing will push forward the rack-bar until the end of his thumb comes in contact with the lug 109. The distance that the carriage moves will therefore be determined by the projection 107 that is grasped by the operator. For instance, if the first projection, or the one nearest the lug 109, is taken hold of the carriage will move sufficiently to print from the first two type-wheels. It being customary to print two figures always for cents, no arrangement is made for moving the carriage a sufficient distance to print from one type-wheel only. If the operator grasps the fourth projection 107, the carriage will be moved far enough to print from five type-wheels, and so on. The rack-bar 42 is preferably provided with the projecting end 110, and this is engaged by a spring 111, that extends within the casing to its forward end and is connected to a suitable fixed lug within said casing. When the rack-bar is in its normal position, as shown in Fig. 3, the spring is entirely within the casing. When the rack-bar is pushed forward, the spring is distended, and upon releasing the rack-bar the spring tends to draw said bar back, and thereby reverses the rotary movement of the cam-shaft and returns the carriage to its original position.

I have described the arm 41 as being operated by means of the rack-bar 42. This operation is obtained as follows: The side of the rack-bar is provided with slots 112, and the arm 41 has upon its end a lug arranged to travel in this slot. (See Fig. 12.) A pivoted block 113 is arranged in the side of the rack-bar, and a spring 114 engages the pivot-pin of said block and tends to hold the end of the block against the bottom of the groove 112, as shown in Fig. 12 of the drawings. An inclined groove 115 is provided above the groove 112, and a block 113 forms the lower wall of one part of said inclined groove. When the rack-bar is advanced, the lug on the arm 41 passes under the block 113 and travels along in the groove 112. When the rack-bar is reversed, the lug travels in the groove 112 until it reaches the block 113, when it rides up over said block and through the groove 115 back to the end of the groove 112. This movement rocks the shaft 40, and, through the arms 39 and 38, moves the plate 35 and resets all of the item-wheels at zero after each printing operation. I provide suitable spools 119 for the printing-ribbons 88 and 89. These spools are preferably mounted upon movable shafts 120 in suitable bearings on the case of the machine. The bearings for one spool-shaft are preferably provided in the projection 108 and the bearings for the other in the projections 121. The projection 108 incloses the spools at one side of the machine and also forms means to be grasped by the operator when he is operating the machine. I also prefer to provide the edges of the spools with suitable teeth and provide an operating-pawl 122, having its upper end engaging the slot 123 in the side of the rack-bar 42. This slot is inclined for a portion of its length, so that as said rack-bar is operated the pawl will be moved for the purpose of turning the spool, and thereby slightly advancing the printing-ribbon. The ribbons are therefore fed step by step until they are wound off from the spool at the right-hand side of the machine and onto the spool at the left-hand side. The spools may then be taken out and reversed, the full spool being placed at the right-hand side of the machine and the empty spool at the left-hand side, and the operation may be repeated as often as necessary. I prefer to carry the ribbons each through a suitable slotted rod 125, which forms a tension device for said ribbons. Any other suitable tension device preferred may be employed. The side of the rack-bar 42 is preferably inclosed, and said bar is held in position by means of the movable plate 126, that is suitably secured to the side of the case. If preferred, different-colored ribbons may be used in the same machine. For instance, the ribbon that prints the items may be black and the ribbon that prints the totals may be red. This will show at a glance whether any number that has been printed is an item or a total.

The operation of the machine is as follows: The parts being in the position shown in Fig. 1 of the drawings, the operator inserts the point of a suitable stylus or operating-tool into the appropriate slot 11, being guided in doing so by the figures placed between said slots, and draws the tool toward him until it reaches the end of the slot. This will rotate the spiral shaft and the wheels carried thereby the number of tenths of a revolution indicated by the number opposite the part of the slot into which the stylus was inserted. For instance, if the wheels are standing at zero and the stylus is inserted in the end of the slot opposite the figure 9 and drawn to the other end of the slot "9" will appear in the appropriate opening 13 and also in the appropriate opening 14, and the type-wheels will be turned so as to bring the "9" type into the printing position on both wheels. After setting up a number representing an item in this manner the operator moves the rack-bar, thereby advancing the carriage and printing the numbers thus set up on the slip of paper. The reverse movement of the rack-bar returns the carriage to its original position and at the same time resets the item-indicating wheels and item-printing wheels at zero. The total-indicating wheels and the total-printing wheels remain in the position to which they have been moved. The next item may then be added and listed in the same manner, and when all of the items have been listed the platen will be shifted so as to be brought over the other printing-ribbon, and the rack-bar being again operated the total amount will be printed. If it is then desired to reset the machine at zero, the key 58 is pressed downward and held, and the finger pieces or keys 54 are then drawn forward, moving the plates 50 and turning the spiral shafts and the wheels carried by them back to zero position.

The machine will be found to be exceedingly simple and easily operated, and all of the parts being positively connected it will be found to be absolutely accurate.

I do not limit myself to the details of the construction, as it is obvious that the same may be varied in many particulars without departing from my invention.

I claim as my invention and desire to secure by Letters Patent—

1. The combination, with a spiral shaft adapted to be rotated by suitable means engaged therewith, of an indicator upon said shaft, a cam secured upon said shaft, and means for engaging said cam and resetting said indicator at zero.

2. The combination, with a series of spiral shafts, connected by suitable transfer devices and each capable of rotation by means engaged therewith, of an indicator upon each of said shafts, a cam upon each shaft, and means for engaging said cam and resetting said indicators at zero.

3. The combination, with a spiral shaft adapted to be rotated by a tool engaged therewith and moved longitudinally thereof, of an indicator upon said shaft, a cam secured upon said shaft, and means for engaging said cam and resetting said indicator at zero.

4. The combination, with a spiral shaft adapted to be rotated by a tool engaged therewith and moved longitudinally thereof, and with a guide for said tool, of an indicator upon said shaft, a cam upon said shaft, means for engaging said cam and resetting said indicator at zero.

5. The combination, with a series of spiral shafts connected by suitable transfer devices and each capable of rotation by a tool engaged therewith and moved longitudinally thereof, of an indicator upon each of said shafts, a cam upon each shaft, and means for engaging said cams and resetting said indicators at zero.

6. The combination, with a spiral shaft adapted to be rotated by a tool engaged therewith and moved longitudinally thereof, of an indicator upon said shaft, a printing type-wheel also upon said shaft, a cam upon said shaft, and means for engaging said cam and resetting said indicator and type-wheel at zero.

7. The combination, with a spiral shaft adapted to be rotated by a tool engaged therewith, of an indicator mounted upon said shaft, a sleeve surrounding said shaft, a second indicator mounted upon said sleeve, and means for connecting said sleeve with said shaft.

8. The combination, with a spiral shaft adapted to be rotated by a tool engaged therewith, of an indicator mounted upon said shaft, a sleeve surrounding said shaft, a second indicator mounted upon said sleeve, means causing said sleeve to be rotated with said shaft, and means for independently resetting said sleeve and the indicator carried thereby.

9. The combination, with a spiral shaft adapted to be rotated by a tool engaged therewith, of an indicator mounted upon said shaft, a sleeve surrounding said shaft, an indicator mounted upon said sleeve, means connecting said sleeve with said shaft and causing it to be rotated therewith, means for disconnecting said sleeve from said shaft and moving said sleeve independently for the purpose of resetting its indicator at zero.

10. The combination, with a spiral shaft and means for operating said shaft, of an indicator mounted thereon, a sleeve surrounding said shaft, an indicator mounted upon said sleeve, means for connecting said sleeve with said shaft, and means for disconnecting said sleeve from said shaft and rotating said sleeve independently of said shaft for the purpose of resetting its indicator at zero.

11. The combination, with a spiral shaft, and means for operating said shaft, of an indicator mounted upon said shaft, a sleeve surrounding said shaft, an indicator and a type-wheel mounted upon said sleeve, means for connecting said sleeve with said shaft and means for disconnecting said sleeve from said shaft and rotating said sleeve independently for the purpose of resetting its indicator and type-wheel at zero.

12. The combination, with a spiral shaft, and means for operating said shaft, of an indicator mounted upon said shaft, a sleeve surrounding said shaft, an indicator mounted upon said sleeve, means for connecting said sleeve with said shaft, means for disconnecting said sleeve from said shaft and holding said sleeve stationary while the shaft is rotated for the purpose of resetting the indicator upon the shaft at zero.

13. The combination, with a suitable shaft, and means for operating said shaft, of an indicator and a type-wheel mounted upon said shaft, a sleeve surrounding said shaft, an indicator and a type-wheel mounted upon said sleeve, means for connecting said sleeve with said shaft, means for disconnecting said sleeve from said shaft and holding said sleeve in a stationary position while said shaft is rotated for the purpose of resetting its indicator and type-wheel at zero.

14. The combination, with a series of spiral shafts connected by suitable transfer devices and each capable of rotation by suitable means engaged therewith, of an indicator mounted upon each shaft, a sleeve surrounding each shaft, an indicator mounted upon each sleeve, means for connecting all of said sleeves with said shafts, means for disconnecting said sleeves from said shafts and means for rotating said sleeves independently for the purpose of resetting their indicators at zero.

15. The combination, with a spiral shaft adapted to be rotated by suitable means engaged therewith, of a type-wheel upon said shaft, suitable paper-carrying means, and means for pressing the paper against said type-wheel.

16. The combination, with a series of spiral shafts adapted to be rotated by suitable means engaged therewith, a type-wheel upon each of said shafts, paper-carrying means, and means for pressing said paper successively against said type-wheels.

17. The combination, with a series of spiral shafts connected by suitable transfer devices, and each capable of rotation by means engaged therewith, of a type-wheel upon each of said shafts, a carriage arranged to move successively across said type-wheels, means for supporting paper upon said carriage, and means for successively pressing said paper against said type-wheels.

18. The combination, with a series of spiral shafts connected by suitable transfer devices, and each capable of rotation by means engaged therewith, of a type-wheel arranged upon each of said shafts, a paper-carriage, means for moving said carriage across said type-wheels, and means for successively pressing the paper against said type-wheels.

19. The combination, with a series of type-wheels, and means for operating the same, of a paper-carriage arranged to be moved across said type-wheels, and means for successively pressing the paper against said type-wheels as said carriage is moved.

20. The combination, with the two series of type-wheels, of a paper-carriage, means for moving said carriage, means for pressing the paper successively against said type-wheels as the carriage is moved, and means for adjusting the paper-operating devices so as to cause the paper to be pressed against either series of type-wheels, as desired.

21. The combination, with two series of type-wheels and inking-ribbons for each series, of a paper-carriage adapted to be moved across said type-wheels, means for successively pressing the paper against said type-wheels as said carriage is moved, and means for adjusting the paper-operating devices so as to cause the paper to be pressed against the wheels of one series or the other, as desired.

22. The combination, with the series of type-wheels and the paper-carriage, of the spirally-grooved cam-shaft adapted to move said carriage across said type-wheels and to press the paper against said type-wheels.

23. The combination, with the type-wheels, of the paper-carriage and the spiral shaft engaging said carriage and adapted to move the same across said type-wheels.

24. The combination, with the type-wheels, the paper-carriage, the spirally-grooved shaft by which said carriage is moved, and means for rotating said shaft.

25. The combination, with the type-wheels, of the paper-carriage, the spirally-grooved shaft engaging said carriage, the rack-bar for rotating said spirally-grooved shaft, and means for successively pressing the paper against said type-wheels as the carriage is advanced by said spirally-grooved shaft.

26. The combination, with the type-wheels, of the paper-carriage, a grooved shaft by which said carriage is moved, a platen mounted upon said carriage, and means for successively pressing said platen against said type-wheels as the carriage is advanced.

27. The combination, with the spirally-grooved shafts and the type-wheels carried thereby, of the paper-carriage, the spiral shaft by which said carriage is operated, a movable platen mounted upon said carriage, and means for successively pressing said platen against said type-wheels as said carriage is moved.

28. The combination, with the spirally-grooved shafts, indicating-wheels and type-wheels mounted thereon, of sleeves mounted upon said shafts, indicating-wheels and type-wheels secured upon said sleeves, a paper-carriage arranged to be moved across said type-wheels, a spirally-grooved shaft by which said carriage is moved, a movable platen mounted upon said carriage, and means for successively pressing said platen against said type-wheels as said carriage is moved.

29. The combination, with the two series of type-wheels, of the paper-carriage, the platen mounted upon said carriage and adapted to be moved in line with either series of wheels, the spirally-grooved cam-shaft adapted to advance said carriage and to depress said platen as said carriage advances, and means for operating said shaft.

30. The combination, with the series of type-wheels, of a carriage arranged to be moved across said type-wheels, means upon said carriage for supporting a roll of paper, means upon said carriage for feeding the paper, means for moving said carriage, and means for successively pressing the paper against said type-wheels as said carriage is moved.

31. The combination, with the two series of type-wheels, of the paper-carriage, the platen, and means for adjusting said platen in line with either series of type-wheels.

32. The combination, with the type-wheels, and the cam-shaft, of the pivotally-supported platen or plunger arranged between said cam-shaft and said type-wheels.

33. The combination, with the type-wheels, of the movable carriage, the cam-shaft and the pivotally-supported platen arranged upon said carriage between said cam-shaft and said type-wheels.

34. The combination, with the type-wheels, of the movable carriage, the adjustable platen-holder arranged upon said carriage, and the movable platen or plunger carried by said platen-holder.

35. In an adding-machine, the combination, with the spirally-grooved shaft 7, of a sleeve 23 mounted thereon and provided with the indicating-wheel 24, substantially as described.

36. In an adding-machine, the combination, with the spirally-grooved shaft 7, provided with the indicating-wheel 16 and the type-wheel 17, of the sleeve 23 mounted thereon and provided with the indicating-wheel 24 and the type-wheel 25.

37. The combination, in an adding-machine, with the spirally-grooved shaft 7 provided with the indicating-wheel 16, of the sleeve 23 mounted thereon and provided with the indicating-wheel 24, means for causing said sleeve to rotate with said shaft, and means for releasing said sleeve and reversing its rotation independently of said shaft.

38. In an adding-machine, the combination, with the series of spirally-grooved shafts 7 provided with the indicating-wheels 16 and with the cams 49, of the sliding plates 50, provided with the projections 51 adapted to engage said cams 49 and to rotate said shafts for the purpose set forth.

39. In an adding-machine, the combination, with the series of spirally-grooved shafts 7 provided with the indicating-wheels 16 and the cams 49, of the transfer devices arranged between said shafts, and the sliding plates 50, provided with the projections 51, adapted to engage said shafts, for the purpose set forth.

40. In an adding-machine, the combination, with the spirally-grooved shaft 7, provided with the indicating-wheels 16 and the cams 49, of the sleeves 23, mounted upon said shafts, provided with the indicating-wheels 24 and with the cams 34, the sliding plates 50 provided with the projections 51 and adapted to engage the cams 49, and the sliding plate 35 provided with the projections 37, adapted to engage the cams 34, substantially as described.

In witness whereof I have hereunto set my hand this 17th day of May, 1902.

WILLIAM P. SHATTUCK.

In presence of—
A. C. PAUL,
C. G. HANSON.